Patented Mar. 9, 1926.

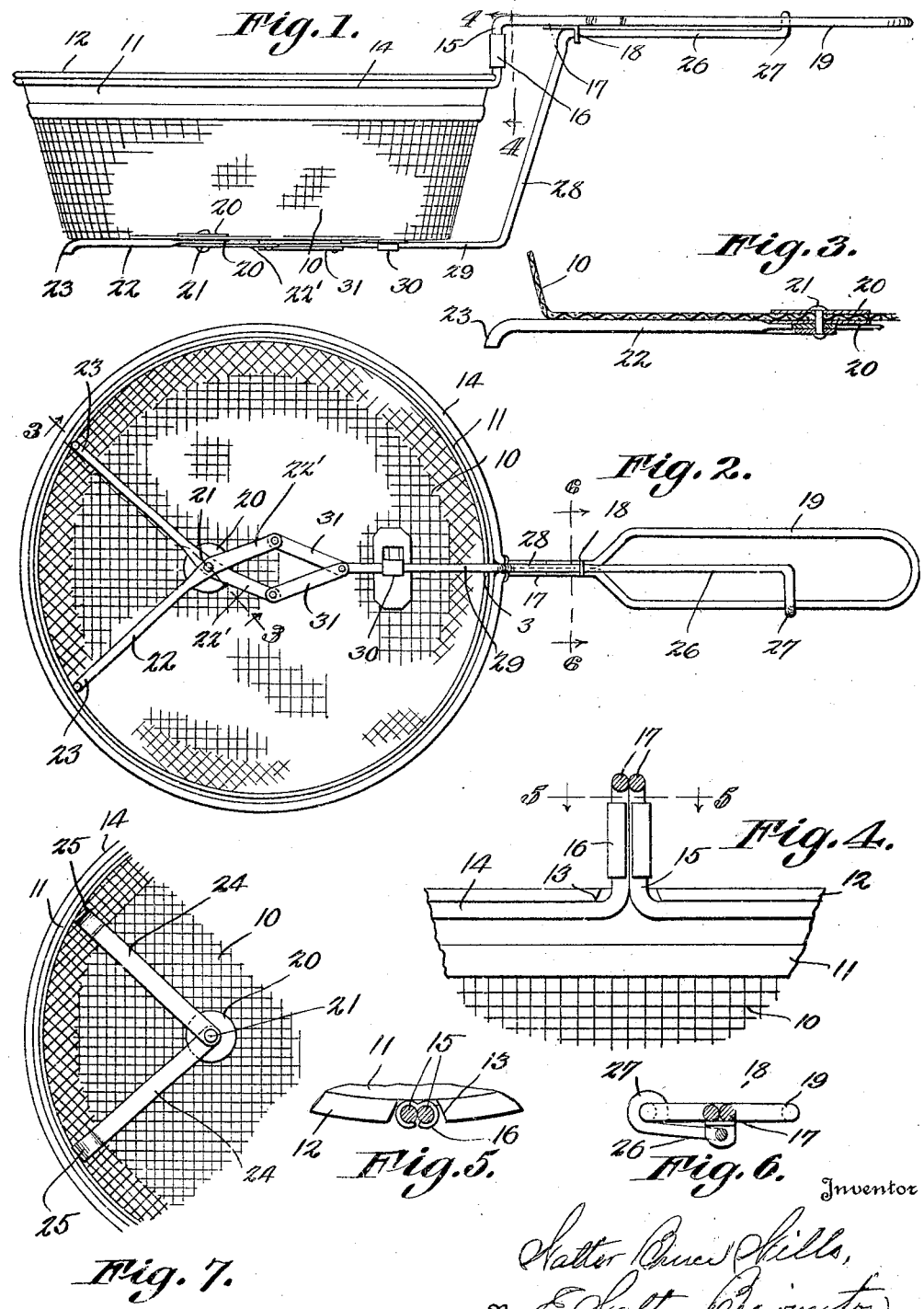

1,576,124

UNITED STATES PATENT OFFICE.

WALTER BRUCE WILLS, OF BALTIMORE, MARYLAND.

FRYING BASKET.

Application filed October 1, 1925. Serial No. 59,902.

*To all whom it may concern:*

Be it known that I, WALTER BRUCE WILLS, a citizen of the United States, residing at Baltimore city, State of Maryland, have invented certain new and useful Improvements in Frying Baskets, of which the following is a specification.

This invention relates to frying baskets of the type shown in my copending application for patent filed the 30th day of September, 1925, and bearing the Serial Number 59,514.

One important object of the invention is to provide a novel form of front supports for a frying basket of this character, the supports being capable of being housed beneath the basket when the latter is placed in the hot grease, if this is necessary, and being similarly housed for storing or nesting.

A second important object of the invention is to provide an improved basket of this kind having front and rear supports so connected as to move simultaneously between housed and protruded positions.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a basket constructed in accordance with this invention.

Figure 2 is a bottom plan thereof.

Figure 3 is an enlarged detail section on the line 3—3 of Figure 2.

Figure 4 is an enlarged detail section on the line 4—4 of Figure 1.

Figure 5 is a section on the line 5—5 of Figure 4.

Figure 6 is an enlarged section on the line 6—6 of Figure 2.

Figure 7 is a partial bottom plan view showing a modified form of front support.

In the embodiment of the invention herein illustrated there has been shown a woven wire basket or body 10 of frusto-conical form and having its upper edge bound and reinforced by a band 11 provided at its upper edge with an out turned flange 12. This flange is interrupted at the point from which the handle extends as shown at 13.

Around the band 11 beneath the flange 12 extends a wire 14 and at the gap 13 the wire extends upwardly through said gap in parallel portions 15. Around these parallel portions extends a split sleeve or band 16 which is crimped, as shown in Figure 5, to closely engage the portions 15 and hold them tightly together so that the wire 14 can neither slip off the basket nor turn around it. At the upper ends of the portions 15 the wire is bent away from the basket to provide parallel portions 17 carrying a guide 18. Beyond the guide 18 the handle grip 19 is formed having parallel sides, converging front portions meeting the portions 17 and a curved extremity.

Above and below the bottom of the basket or body are reinforcing washers 20 which are connected by a rivet 21 forming a pivot; connected to this pivot below the bottom are the front supports each of which may consist of a single length of wire bent to form arms 22 and 22′ the latter being flat to receive the pivot and each provided with a hook end 23 as in Figure 2, or these supports may be of flat strips 24 each connected at one end to the pivot and provided on the other end with a hook 25.

The remaining support consists of a wire 26 slidable through the guide 18 and having one extremity bent around one side of the handle grip 19 as at 27. The other part of this wire extends downward as at 28 parallel to the basket side and then inwardly as at 29 beneath the basket bottom. A guide 30 is provided for this inwardly extending portion and links 31 connect the arms 22′ with the portion 29 of the rear support. Owing to the diverging relation of the arms 22′ inward motion of the rear support swings the front supports on their pivot and since the rivet 21 is eccentric of the basket bottom the forward hooks will be swung to lie beneath the bottom.

There has thus been provided a simple and efficient device of the kind described and for the purpose specified.

It is obvious that minor changes may be made in the form and construction of the invention without dparting from the material spirit thereof. It is not, therefore, desired to confine the invention to the exact form herein shown and described, but it is desired to include all such as properly come within the scope claimed.

Having thus described the invention, what is claimed as new, is:

1. A utensil of the kind described having a plurality of supporting arms pivoted beneath the bottom of the utensil eccentrically thereof and arranged to protrude beyond said bottom when swung into one position and to be housed beneath said bottom when swung into a second position, a further supporting arm located beneath the bottom and movable inwardly and outwardly thereof, and means connecting said arms for simultaneous movement.

2. A utensil of the kind described having a plurality of supporting arms pivoted beneath the bottom of the utensil eccentrically thereof and arranged to protrude beyond said bottom when swung into one position and to be housed beneath said bottom when swung into a second position, said arms having hook shaped free extremities, a further supporting arm located beneath the bottom and movable inwardly and outwardly thereof, and means connecting said arms for simultaneous movement.

3. A utensil of the kind described having a plurality of supporting arms pivoted beneath the bottom of the utensil eccentrically thereof and arranged to protrude beyond said bottom when swung into one position and to be housed beneath said bottom when swung into a second position, a further supporting arm located beneath the bottom and movable inwardly and outwardly thereof, means connecting said arms for simultaneous movement, and a handle extending from the utensil and supporting the last mentioned arm movably into and out of protruded position.

In testimony whereof I affix my signature.

WALTER BRUCE WILLS.